(12) United States Patent
Visagie et al.

(10) Patent No.: US 6,558,252 B2
(45) Date of Patent: May 6, 2003

(54) BLOWER FOR COMBINE HARVESTERS HAVING A SEPARATION UNIT

(75) Inventors: Andrie Visagie, Bothaville (ZA); Thomas Barrelmeyer, Versmold (DE)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/920,074

(22) Filed: Aug. 1, 2001

(65) Prior Publication Data

US 2002/0037758 A1 Mar. 28, 2002

(30) Foreign Application Priority Data

Aug. 1, 2000 (GB) ............................................ 0018712

(51) Int. Cl.[7] .............................................. A01F 12/48
(52) U.S. Cl. ........................................ 460/99; 460/100
(58) Field of Search ........................... 460/100, 99, 69, 460/111, 114, 97, 98, 119, 903, 44, 23; 56/51, 60, 14.6

(56) References Cited

U.S. PATENT DOCUMENTS

| | | | |
|---|---|---|---|
| 2,173,605 A | * | 9/1939 | Edwards, Jr. ............... 460/100 |
| 4,250,897 A | * | 2/1981 | Glaser ........................... 415/7 |
| 4,869,272 A | | 9/1989 | Ricketts et al. |
| 5,454,758 A | | 10/1995 | Tophinke et al. |
| 6,358,141 B1 | * | 3/2002 | Stukenholtz et al. ....... 460/100 |

FOREIGN PATENT DOCUMENTS

| | | | |
|---|---|---|---|
| DE | 196 24 733 | 1/1998 | |
| JP | 10-191767 | 7/1998 | |
| JP | 2000166364 A | * 6/2000 | ........... A01F/12/32 |

* cited by examiner

Primary Examiner—Robert E. Pezzuto
Assistant Examiner—Árpád Fábián Kovács
(74) Attorney, Agent, or Firm—Husch & Eppenberger, LLC; Robert E. Muir; Richard J. Musgrave (57) ABSTRACT

A self-propelled combine harvester includes a separation unit having at least one rotor housing, a sieve mechanism with sieve openings and a rotor rotatably mounted therein. A grain collecting element is arranged adjacent the sieve mechanism. A cleaning apparatus receives the grain kernels collected from the grain collecting element. A sucking blower unit generates a sucking air flow stream. The sucking blower unit draws an air stream in an upward direction through a conduit which guides the air flow stream from a space between the rotor housing of the separation unit and the grain collecting element around a front wall of the housing of the separation unit towards the sucking blower unit. A second discharge location for chaff and broken straw draws the chaff and the broken straw from under the separation unit through the conduit via the sucking blower unit. The mixture of the air, the chaff and the broken straw is directed to the ground or into a chopper via a collection duct.

28 Claims, 4 Drawing Sheets

BLOWER FOR COMBINE HARVESTERS HAVING A SEPARATION UNIT

TECHNICAL FIELD OF THE INVENTION

The present invention relates generally to combine harvesters, and more specifically, an apparatus and method for improving the cleaning process in a combine harvester.

DESCRIPTION OF THE RELATED ART

Combine harvesters having axial flow and separation units are known in the art. The separation unit separates grain kernels from harvested materials. Working elements of a separation rotor contact and beat the harvested material, wherein the beating is similar to a threshing action. Members, such as special beaters and rasp bars, can be operatively arranged on the rotor element and on internal surfaces of the rotor housing, which produce a special threshing effect, but they are not necessary for the rotary threshing and separation unit. There may be additional threshing elements arranged outside of the rotary threshing and separation unit. The separation units may be arranged in a longitudinal direction or transverse to the travelling direction of the combine harvester. There may be one or two rotor housings operatively arranged on the same or on different levels or arranged horizontally or inclined on an angle. There may be one or more rotors operatively arranged in a rotor housing. If two or more rotors are used, they may rotate in the same or opposite direction with respect to each other.

The separation unit has a high separation capacity due to the high centrifugal forces being applied to the harvested material in the rotor housing resulting not only in grain kernels, but also the chaff and broken straw, being separated from the harvested materials. This mixture of grain kernels, chaff and broken straw needs to be separated to achieve a clean sample of grain kernels, which is collected in the grain bin. This cleaning process is usually achieved by a special cleaning apparatus, such as a conventional sieve, through which air is blown from below. As such, the lighter fractions like the chaff and the broken straw are carried away by the blowing air and blown out of the combine harvester and the heavier grain kernels fall through the sieve openings. There are various cleaning apparatuses known to those skilled in the art. A common disadvantage with these cleaning apparatuses is that the capacity may not be as high as the separation capacity of the separation unit, thereby limiting the throughput capacity of the combine harvester.

Attempts have been made to increase the cleaning capacity of a combine harvester. U.S. Pat. No. 4,869,272 describes a cross-flow fan located adjacent to an inlet end of a threshing cage to direct air past the threshing cage to provide a more efficient separation of the grain from the chaff or the broken straw. However, this device utilizes air from an upper sieve area of the cleaning apparatus, creating a very strong air flow through an initial portion of the sieves, and the grain kernels passing therein tend to be blown upwards precluding the grain kernels from passing through the openings in the sieve of the cleaning apparatus. Additionally, the air passing the sieve openings is reduced because the air from the cleaning apparatus is blown upwards into the direction of a cross-flow fan; hence, the cleaning action in this area is also reduced. Because there are two cross-flow fans arranged beside a single rotor housing, the air flow along the lateral direction over the sieves is disturbed. As a result, the cleaning performance of the cleaning apparatus is adversely affected by the cross-flow fans.

German Patent No. DE 196 24 733 attempts to increase the cleaning performance of a combine harvester by an additional air flow stream generating mechanism. An air flow stream is directed through a space between conventional straw walkers, which is used for separation of grain kernels from harvested material, and as a grain collecting element arranged underneath the straw walkers to reduce the adverse effects on the cleaning process. To direct away the chaff and the broken straw from grain kernels accumulating on the grain collecting element, high air flow speeds are necessary. Due to this increase in speed, there is a higher probability that the grain kernels, which have been separated from the harvested material by the straw walkers, will not fall onto the grain collecting element and will be sucked into the blower unit and blown out of the combine harvester, resulting in crop loss. Another disadvantage is that due to the large number of openings in the conventional straw walkers, the air flow stream generated by the blower unit is sucked into the space underneath the straw walkers through the openings from the space above the straw walkers, and by this air flow stream, additional chaff and broken straw is sucked through the straw walker openings which is not desirable.

The present invention is directed to overcoming one or more of the problems set forth above.

SUMMARY OF THE INVENTION

An aspect of the present invention is to provide a sucking blower unit for a combine harvester to improve and increase the cleaning capacity.

In another aspect of the present invention there is provided a method for improving and increasing the cleaning capacity of a combine harvester.

In another aspect of the present invention there is provided an apparatus and method for producing an air stream to improve and increase the cleaning process.

Another aspect of the present invention there is provided an apparatus for improving and increasing the cleaning capacity that can be retrofitted for existing combine harvesters.

In accordance with the present invention there is provided a combine harvester for harvesting crop and separating grain from chaff and broken straw, including a separation unit for separating the grain from the harvested crop; at least one rotor housing with a sieve mechanism, wherein the sieve mechanism has a plurality of sieve openings therein; a rotor operatively and rotatably mounted in the at least one rotor housing; a grain collecting element operatively mounted adjacent to and for receiving the grain from the sieve mechanism; a cleaning apparatus for receiving grain collected from the grain collecting element; a sucking blower unit for sucking an air flow stream towards the sucking blower unit, wherein the air flow stream is drawn upwardly through a conduit operatively connected thereto; and wherein the conduit directs the air flow stream from a space between the at least one rotor housing of the separation unit and the grain collecting element in a semi-circular movement towards the sucking blower unit.

The above aspects are merely illustrative and should not be construed as all-inclusive. The aspects should not be construed as limiting the scope of the invention. The aspects and advantages of the present invention will become apparent, as it becomes better understood from the following detailed description when taken in conjunction with the accompanying drawings.

BRIEF DESCRIPTION OF THE DRAWINGS

Reference is now made to the drawings, which illustrate the best known mode of carrying out the invention and wherein the same reference characters indicate the same or similar parts throughout the views.

DETAILED DESCRIPTION

Figure 1:
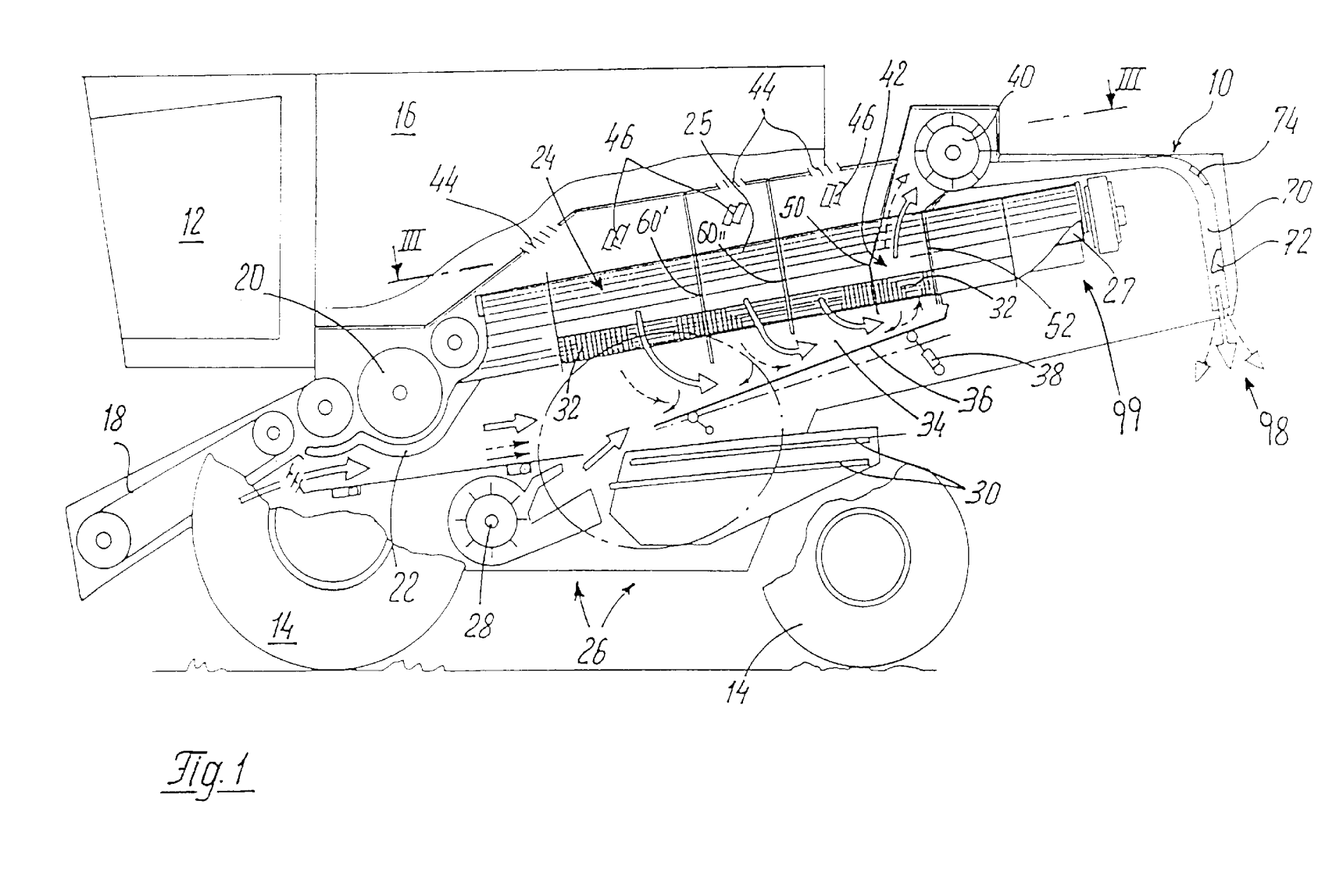
FIG. 1 is a side view of a self-propelled combine harvester with parts broken away to show a partial inside view thereof.

Referring now to FIG. 1, there is illustrated a self-propelled combine harvester 10 having a cabin 12 for an operator, a plurality of wheels 14, a grain tank and engine compartment 16, a feeder house 18 having a header (not shown) operatively attached thereto. The self-propelled combine harvester 10 has a separation unit 24, having at least one rotor housing 25, a threshing drum 20 with a concave 22, a cleaning apparatus 26, which receives the grain collected from a grain collecting element 36 having a blower unit 28, which generates a blowing air flow stream, and cleaning sieves 30. The rotor housing 25 has a sieve mechanism 32 with openings therein, and a rotor 27 operatively mounted and rotatable within the rotor housing 25. Harvested material is cut or picked up by the header and then fed into the self-propelled combine harvester 10 via the feeder house 18. The harvested crop is transferred to and threshed by the threshing drum 20 and the concave 22. The threshing drum 20 and the concave 22 transport the harvested crop to the separation unit 24. A rotor 27 operatively and rotatably mounted in the separation unit 24 cause a helical movement. The harvested material is forced by this helical movement around a longitudinal axis of the rotor 27 of the separation unit 24. Some grain kernels exit the separation unit 24 through a plurality of openings in a sieve mechanism 32. Along with the grain kernels, a portion of chaff and broken straw exit the separation unit 24. The exiting grain kernels, the chaff and the broken straw fall into a duct 34, which is closed at a bottom by the grain collecting element 36. The straw leaves the separation unit 24 at a discharge end, from where it is chopped, if desired, and deposited on the field.

The grain collecting element 36 is shown as a return pan. The return pan improves the transportation of the grain kernels in a direction of the cleaning apparatus 26 against the air flow stream passing through the duct 34 underneath the separation unit 24. In alternative embodiments, the grain pan is driveable in oscillating movements, or by a conveyor belt. The grain collecting element 36 is transverse to the separation unit 24 to facilitate the movement of the grain kernels falling thereon to the cleaning apparatus 26. In an alternative embodiment, the grain collecting element 36 has step-like ribs (not shown) formed therein, wherein the grain kernels move down the step-like ribs.

Figures 2, 3:
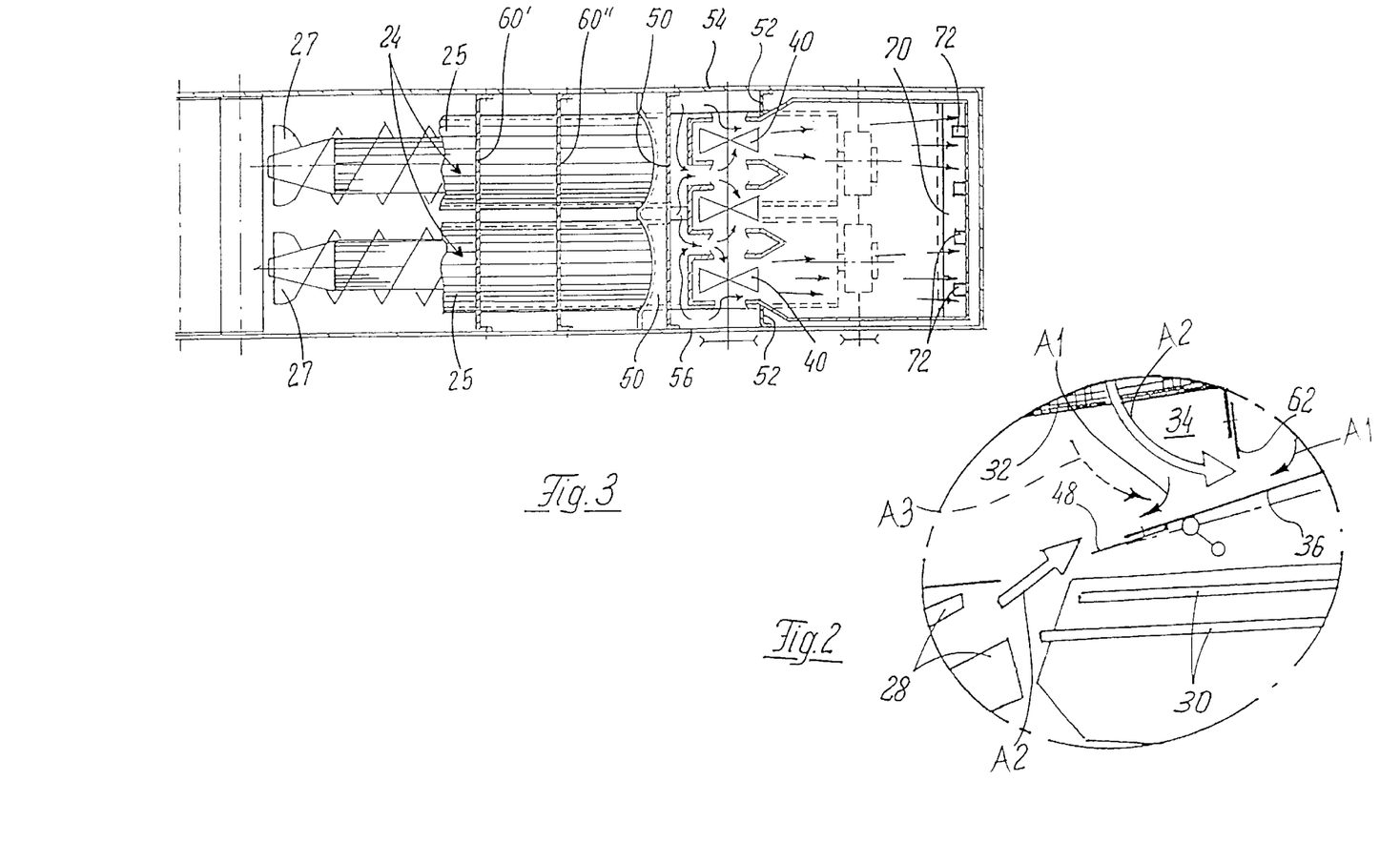
FIG. 2 is an enlarged view of a portion of FIG. 1.
FIG. 3 is a top view as seen from line III—III in FIG. 1.

FIG. 2 illustrates paths of travel of the grain kernels shown as solid arrows A1, paths of travel of the air flow stream shown as arrows A2 and paths of travel of the chaff and the broken straw shown as broken line arrows A3. As illustrated by the arrows A1, A2, A3 in the duct 34, the path of travel of the grain kernels A1 is contrary to the path of travel of the chaff A3 and the path of travel of the air flow stream A2. To improve the separation between the grain kernels on the grain collecting element 36 and other fractions, such as the chaff and the broken straw, a plurality of openings (not shown) in the grain collecting element 36 is provided, which allows air to be drawn through into the duct 34. The air stream flow through the plurality of openings provides an additional cleaning or separation of the grain kernels on the grain collecting element 36.

FIGS. 1 and 3 illustrate a sucking blower unit 40, such as an exhaust fan, that draws or sucks air through a conduit 42 from the duct 34. The air flow stream facilitates the separation of chaff and broken straw from the grain kernels in the duct 34. The conduit 42 has a front wall 50, a rear wall 52 and at least two side walls 54, 56. This design is simple and inexpensive to manufacture. The cross-section of the conduit 42 is narrowed in the direction away from the grain collecting element 36 and towards the sucking blower unit 40. The speed of the air flow stream created by the sucking blower unit 40 can be maintained on a substantially constant level, so that minimal amounts of the transported material is not lost, or the speed can be accelerated as the case may be. The speed of the air flow stream in the conduit 40 or in areas under section walls 60',60" is variable by adjustment of an at least one extension element 62. Hence, the cleaning process is adjustable to the actual harvesting conditions and the type of crop, which is to be harvested. The inclination angle of the grain collecting element 36 is variable; hence, the movement of the grain kernels can be influenced. The sucking blower unit 40 and the inclination angle of the grain collection element 36 are adjustable to achieve optimum performance.

In alternative embodiments, the side walls 54, 56 are sides of the separation unit 24. The front wall 50, the rear wall 52 and the side walls 54, 56 are generally closed, so that the air flow stream generated by the sucking blower unit 40 is forced to move along a direction in which it is forced by the side walls 54, 56 of the conduit 42. The side walls 54, 56 of the conduit 42 form a duct-like shape, which is directed upwards, such that the air flow stream conveying some of the chaff and the broken straw is forced into this upward direction.

The sucking blower unit 40 improves and increases the cleaning capacity by providing a sucking air flow stream in an upward direction through the conduit 42, which guides the air flow stream from a space between the rotor housing 25 of the separation unit 24 and the grain collecting element 36 around a portion of the front wall 50 of the rotor housing 25 of the separation unit 24 toward the sucking blower unit 40. The advantages is that the fractions of the chaff and the broken straw will not hinder the cleaning action of the cleaning apparatus 26, because the sucking blower unit 40 sucks or draws these fractions away. Moreover, the sucking blower unit 40 does not draw in the grain kernels because the sucking blower unit 40 entrance is not in proximity to the sieve mechanism 32 of the separation unit 24. The air flow stream generated by the sucking blower unit 40 is, at one instance, an upward direction through the conduit 42. This movement results in the chaff and the broken straw being separated from the harvested material and sucked into the conduit 42 and whirled away from the grain kernels, which may have been sucked into the conduit 42. The grain kernels are heavier than the fractions of the chaff and the broken straw resulting in the grain kernels falling from the conduit 42 onto the grain collecting element 36, which feeds the grain kernels into the cleaning apparatus 26. The sucking blower unit 40 is effective in removing at least 50% of the chaff and the broken without increasing losses. The remaining chaff and the broken straw is removed by the cleaning apparatus 26. The sucking blower unit 40 increases the cleaning capacity such that the overall capacity of the self-propelled combine harvester 10 is improved because the cleaning capacity is no longer a limiting factor. The separation unit 24 can be designed to process additional harvested crop because of this improvement.

To achieve a continuous air flow stream, air is allowed to enter the area of duct 34 through at least one air inlet opening 44. The at least one air inlet opening 44 is positioned at a top of a housing of the separation unit 24. At least one second air inlet opening can be positioned in a side walls of the housing of the separation unit 24. Air may also be drawn in through the concave 22 and the feeder house 18 or other openings through the cleaning apparatus 26 and also through the openings in the sieve mechanism 32. These mechanisms may be singular or combined depending on the use. In an alternative embodiment, air is drawn in from the front of the self-propelled combine harvester 10 through at least one opening (not shown). The air flow stream is directed through a space underneath the concave 22 over the preparation pan, where a mixture of the grain kernels and chaff are accumulated and moved towards the cleaning apparatus 26. This air flow stream is then capable of not only collecting the chaff and the broken straw from the duct 34 underneath the separation unit 24, but also from the material accumulated on the preparation pan. The air flow stream is effective in separating the different fractions of harvested material.

To transport the grain kernels with minimal damage towards the cleaning apparatus 26, the inclination angle of the grain collecting element 36 and the speed of air flow stream passing through duct 34 need to be adapted with respect to each other. Favorable results can be achieved, if the speed of the air flow stream can be varied, for example by varying the speed of the sucking blower unit 40 (e.g. by operating variator discs on a pulley drive) by changing an open cross-section of air inlet openings or by opening a by-pass close to the sucking blower unit 40, if the inclination angle of the grain collecting element 36 is adjustable, for example by a hydraulic cylinder 38, or a combination of these measurements. These adjustments are made to obtain the optimum air flow stream for the different types of harvested crops being harvested.

It is desirable to create an air flow stream close to the surface of the grain collecting element 36. Therefore, a closed housing through which a defined air flow stream can flow is desirable. The duct 34 is closed in an end region towards the conduit 42 by a wall, which is laterally arranged upon the grain collecting element 36 and operatively mounted to the conduit 42 (e.g. by rubber lips, other flexible elements, etc.). The duct 34 is closed at its sides by side walls of the housing of the separation unit 24. The duct 34 may be extended up to a front wall of the self-propelled combine harvester 10. To allow an air flow stream to flow, an air inlet is positioned so that air is drawn into the housing of the separation unit 24.

The speed of the air flow stream close to the surface of the grain collecting element 36 is controllable to separate the chaff and the broken straw from the grain kernels. If the speed of the air flow stream falls below a certain level, the air flow stream is not able to keep the chaff and broken straw fractions airborne. As a consequence, fractions fall, accumulate and block the cleaning apparatus 26 resulting in downtime. To generate the air flow stream close to the surface of the grain collecting element 36, section walls 60', 60" are provided to create an air flow stream in an upper region of the housing of the separation unit 24. The section walls 60', 60" are transversally arranged to separate sections of the housing of the separation unit 24. The section walls 60', 60" partition the housing and is operatively connected to the top of the housing under the sieve mechanism 32. The section walls 60', 60" encircles the housing of the separation unit 24. Accordingly, the air flow stream generated by the sucking blower unit 40 will only pass at a gap, which is defined by a lower edge of the section walls 60', 60", the side walls of the housing and the surface of the grain collecting element 36. The gap in the longitudinal direction and the limited cross-sections cause the air flow stream to accelerate. The section walls 60', 60" allow the speed of the air flow stream to be controlled as desired. Air is drawn through the at least one air inlet opening 44 and the at least one second air inlet opening 46, arranged in the upper portion of the housing. The accumulation of the chaff in the rotor housing 25 of the separation unit 24 is avoided, because of this continuous downwardly directed air flow stream created by, among other things, the section walls 60', 60" and the at least one air inlet opening 44 and the at least one second air inlet opening 46. In the preferred embodiment, lengths of the section walls 60', 60" are adjustable. By this, it is possible to influence the air flow stream adjacent to the grain collecting element 36. Moreover, the air flow stream is accelerated by the position of the gaps.

FIG. 1 illustrates the air flow stream by the fat hollow arrows. An angle between the direction of the air flow stream moving over the surface of the grain collecting element 36 and the direction of the air flow stream moving through the conduit 42 is shown. The air flow stream curves as it is directed from the housing to the conduit 42 resulting in separation of the grain kernels, which tend to be directed against the rear wall 52 because they have a bigger turning radius and from there onto the grain collecting element 36, and the lighter fractions of the chaff and the broken straw, which have a smaller turning radius than the grain kernels due to their lighter weight, hence, the fractions are directed upwardly through the conduit 42 into the direction of the sucking blower unit 40.

The cross-section of the conduit 42 is decreased in the direction towards the sucking blower unit 40, to increase the speed of the air flow stream to preclude the chaff and the broken straw from settling at an undesired location.

FIG. 2 illustrates the grain collecting element 36 having lengths that are variable by an adjustment of the releasably fixed extension plate 48. The length of the grain collection element 36 controls the air volume which is drawn from the cleaning apparatus 26, and controls the location where the grain kernels falls into the cleaning apparatus 26. The air volume drawn from the cleaning apparatus 26 should be limited because if the air volume drawn from that region is excessive, the function of the cleaning apparatus 26 is adversely affected. The direction of the grain kernels falling from the grain collecting element 36 is controlled so that the grain kernels pass through the air flow stream of the blower unit 28 to separate blow away the rest of the chaff and the broken straw, which may still be mixed with the grain kernels. However, a clearance sufficient in size between the end of the extension plate 48 or the grain collecting element 36 and the upper surface of the sieve mechanism 30 must be maintained to allow the air flow stream generated by the blower unit 28 to pass through the clearance to transport light fractions, like the chaff and the broken straw, out of the self-propelled combine harvester 10. The section walls 60', 60" are extendable by releasably fixed extension elements 62. The releasably fixed extension elements 62 are adjusted to control the speed of the air flow stream at this location.

FIG. 1 illustrates the sucking blower unit 40 drawing in the chaff and the broken straw and blowing same out the rear through a second duct 70. The duct 70 directs the air flow stream having the chaff and the broken straw downwards onto the field. At least one guiding vane 72 are operatively mounted in the second duct 70. The guiding vane 72 is at least one curved so that a lateral distribution of the chaff and the broken straw can be achieved. The air flow stream should not adversely affect a swath laid down by the self-propelled combine harvester 10 by blowing an air flow stream directly into the swath. As such, the swath of the chaff and the broken straw keeps its shape if blown into a sideward direction, which is achieved by the at least one guiding vane 72. If a chopping of the chaff and the broken straw is desired, the second duct 70 is directed into a chopper (not shown), then the air flow stream supports the lateral distribution of the chopped straw, and mixing the chaff and the broken straw with the chopped straw as an even lateral distribution of all fractions is achieved. In the second duct 70, a loss sensors 74 is operatively mounted to indicate to the operator whether there is an blower losses.

FIG. 3 illustrates the separation unit 24 having two housings. The housings have a separation rotor 27 operatively and rotatably mounted therein. The conduit 42 has the front wall 50, the rear wall 52, and the two side walls 54, 56. The section walls 60', 60" are shown in the separation unit 24. The section walls 60', 60" define wind sections between the section walls 60', 60". In each wind section and also in the conduit 42, two openings between the side walls 54, 56 of the rotor housings 25 of the separation unit 24, and a third opening between the two rotor housings 27 are provided. If at least one air inlet opening 44 is open, the conduit 42 sucks an air flow stream pass the at least one air inlet opening 44 at high speed in an upward direction. Grain kernel loss are avoided if the openings in the sieve mechanism are closed because the wind speed in these openings laterally towards the separation unit 24 is very high. By partially closing the sieve openings, the grain kernels exit the separation unit 24 in that region in a direction towards the grain collecting element 36. The embodiment shown in FIG. 3 shows a sucking blower unit 40 having three radial blower elements, which are sucking in the mixture of air, chaff and broken straw from the sides and which blow the air stream away rearwardly. The downwardly extending connecting duct 70 has a plurality of the guiding vanes 72.

Figure 4:
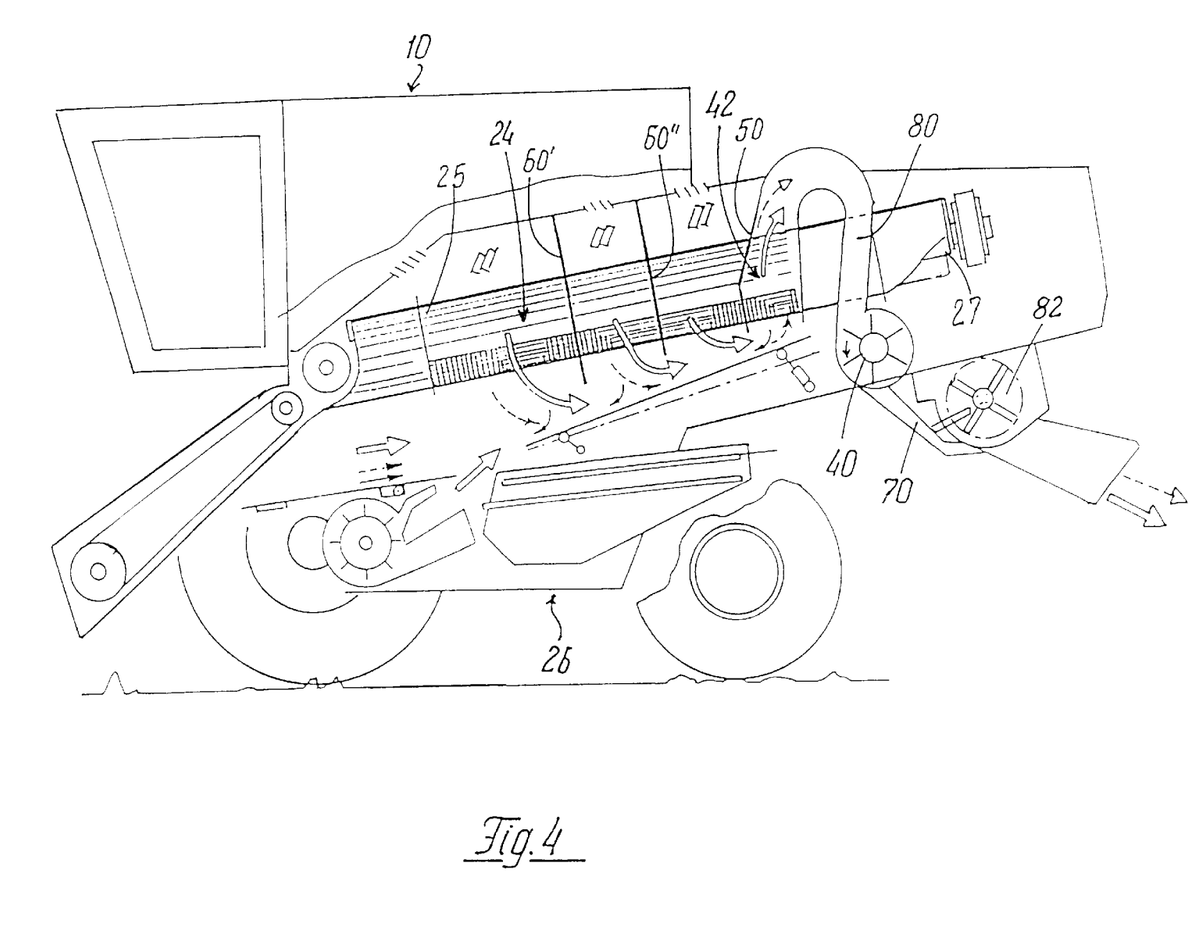
FIG. 4 is a side view of a self-propelled combine harvester having an alternative embodiment of the sucking blower unit.

An alternative embodiment of the invention is illustrated in FIG. 4. The sucking blower unit 40 is positioned at a side or underneath the separation unit 24, not above the separation unit 24 as previously described. Respectively, the sucking blower unit 40 has either two units placed on the sides of the rear hood of the self-propelled combine harvester 10, or one unit placed underneath the separation unit 24, which reaches substantially over the whole width of the housing in that region. To achieve this arrangement a connecting duct 80 extending upwardly from and operatively connected to the conduit 42 is provided. The connecting duct 80 directs the mixture of the air, the chaff and the broken straw upwardly and then downwardly into the sucking blower unit 40. The second duct 70 directs the mixture of the air, the chaff and the broken straw from the connecting duct 80 into a chopper 82, wherein it is distributed over the field. The sucking blower unit 40 is illustrated as a rotor blower. In an alternative embodiment, the sucking blower unit 40 and the chopper 82 are combined into a single device. The single device has the chopper 82 that is capable of producing a voluminous air flow stream. The sucking blower unit 40 is placed in proximity to an outlet opening of the separation unit 24, such that the single device is driven. The chaff and the broken straw fraction is distributed together with the straw fraction exiting the separation unit 24, such that the air flow stream resulting from the single device also supports the lateral distribution of the chopped straw, the chaff and the broken straw. Although the sucking blower unit 40 is shown above or underneath the separation unit 24, those skilled in the art understand that the location can be varied, such as behind the separation unit 24, however, such an arrangement requires the length of the self-propelled combine harvester 10 to be increased.

As illustrated in FIG. 1, the sucking blower unit 40 is arranged in a plane above the separation unit 24. This can be implemented without impeding the functions of the existing components of the self-propelled combine harvester 10. The sucking blower unit 40 is operatively connected to the conduit 42. The mixture of the air, the chaff and the broken straw is received from the conduit 42 and blown out by the sucking blower unit 40 in a downward direction through the discharge duct 70. The energy contained in the air flow stream is used to transport and spread the chaff and the broken straw onto the ground. The guiding vanes 72 and/or loss sensors 74 may be operatively mounted in the discharge duct 70.

In other embodiments, the sucking blower unit 40 is arranged on a plane below or to the side of the separation unit 24. The sucking blower unit 40 is operatively connected with the conduit 42. In the below mounted design illustrated in FIG. 4, the sucking blower unit 40 is operatively connected by a downwardly extending connecting duct 80 on the end of the sucking blower unit 40 opposite the conduit 42. The sucking blower unit 40 is placed at a location where it does not impede the functions of other components of the self-propelled combine harvester 10. In alternative embodiments, the sucking blower unit 40 feeds the mixture of the air, the chaff and the broken straw to the chopper 82 via the connecting duct 80 for discharging at an even distribution.

Figure 5:
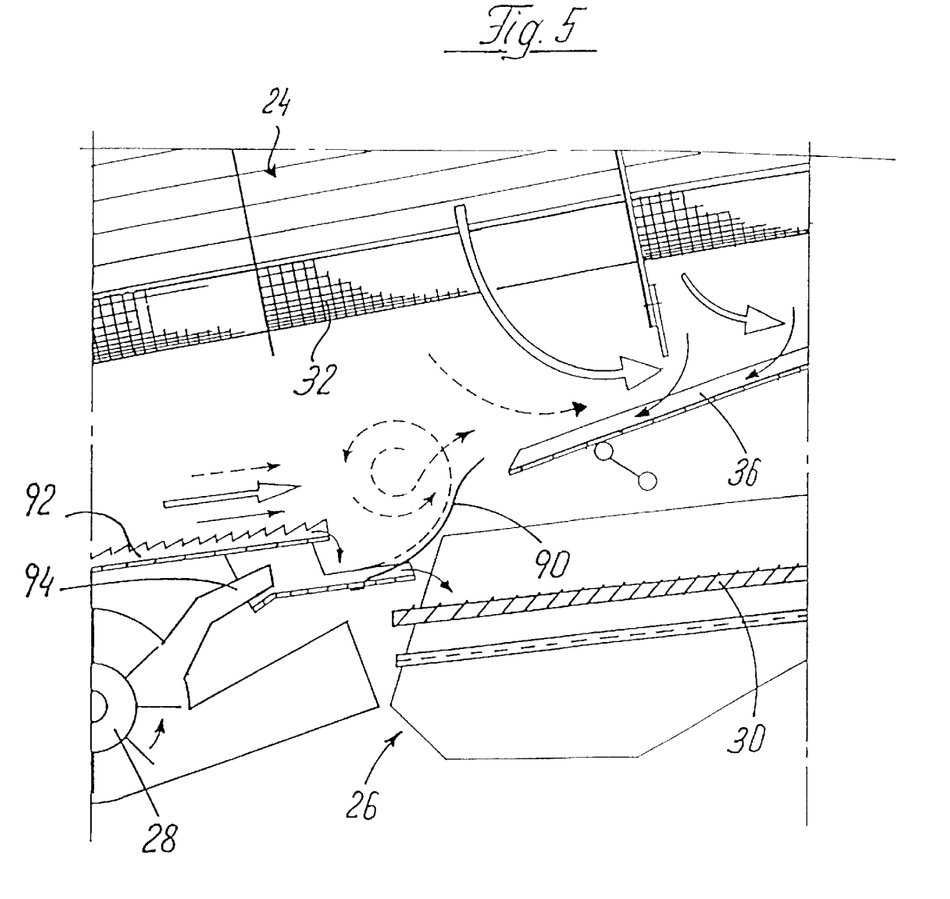
FIG. 5 is an enlarged partial side view showing paths of air flow, grain kernels and separated fractions.

Referring now to FIG. 5, a guiding element 90 is operatively arranged in a transfer zone defined as the area from the grain collecting element 36 and a preparation floor 92 to the cleaning apparatus 26. The guiding element 90 is directed from an outblow or exhaust channel 94 and the blower unit 28 towards the duct 34, whereby an air flow stream is drawn by the sucking blower unit 40. If a layer of the chaff, the broken straw and the grain kernels reaches the end of preparation floor 92, most of the grain kernels on the preparation floor 92 are below the lighter fractions, such as the chaff and the broken straw. The guiding element 90 has a plurality of fingers or lashes (not shown), or has a comb or a web-like shape, so that there are openings between the plurality of fingers or wires. If the grain kernels drop from the preparation floor 92, they fall through the openings onto the sieve mechanism 30. The more bulky and lighter fractions of the chaff and the broken straw, however, are precluded from falling onto the sieve mechanism 30 by the guiding element 90. The air flow stream generated by the blower unit 28 exiting the housing 25 carries these fractions upwardly into the transfer zone in circular motions through the air flow stream generated by the sucking blower unit 40. These fractions are drawn by the second air flow stream towards the sucking blower unit 40, facilitating the cleaning action of the cleaning apparatus 26. The geometries are adaptable to distribute the material from the grain collecting element 36 into the transfer zone such that it is subjected to the air flow stream, further facilitating the cleaning process by removing the chaff and the broken straw and directing same towards the sucking blower unit 40.

A first discharge location is 99 is located at an end of the rotor 27 distal from the threshing rotor 20. A second discharge location 98 for the chaff and the broken straw is located at the end of the discharge duct 70. The chaff and broken straw are sucked away from a region under the separation unit 24 through the conduit 42 by the sucking blower unit 40. The chaff and the broken straw is blown to the discharge duct 70 into the chopper 82 at the second discharge location 98. This results in two paths of travel for the chaff and the broken straw, which need to be separated from the grain kernels to be cleaned. The first path is typical in self-propelled combine harvesters 10. The other path is created by the sucking blower unit 40. The advantage of the second discharge location 98 is that the cleaning function of the cleaning apparatus 26 is not impeded by the chaff and the broken straw, which are sucked off and discharged.

In all of the previously described embodiments, the sucking blower unit 40 can be switched on or off. As such, the sucking blower unit 40 is adaptable to harvesting conditions. The self-propelled combine harvester 10 will not require additional engine power to operate the sucking blower unit 40. In dry conditions, where a significant amount of the chaff and the broken straw is produced, the rotors 27 do not require much energy, and the available energy can be used for operating the sucking blower unit 40. In wet conditions when the rotor 27 requires more power, the sucking blower unit 40 can be switched off because there is very little chaff and broken straw produced in this condition.

While preferred embodiments of the invention have been illustrated by way of example in the drawings and herein particularly described, it will be recognized that many modifications may be made and that the invention is hence in no way limited to the illustrated embodiment.

What is claimed is:

1. A combine harvester for harvesting crop and separating grain from chaff and broken straw, comprising:

a separation unit for separating the grain from the harvested crop;

at least one rotor housing with a sieve mechanism, wherein the sieve mechanism has a plurality of sieve openings therein;

a rotor operatively and rotatably mounted in the at least one rotor housing;

a grain collecting element operatively mounted adjacent to and for receiving the grain from the sieve mechanism;

a cleaning apparatus for receiving grain collected from the grain collecting element;

a sucking blower unit for sucking an air flow stream towards the sucking blower unit, wherein the air flow stream is drawn upwardly through a conduit operatively connected thereto; and wherein the conduit directs the air flow stream from a space between the at least one rotor housing of the separation unit and the grain collecting element in a semi-circular movement towards the sucking blower unit.

2. The combine harvester for harvesting crop and separating grain from chaff and broken straw according to claim 1, further including a second path for the air flow stream, wherein the air flow stream is directed from the second path of travel to the conduit.

3. The combine harvester for harvesting crop and separating grain from chaff and broken straw according to claim 1, further including an at least one extension element, wherein a velocity of an air flow stream in the conduit is variable by adjusting the at least one extension element.

4. The combine harvester for harvesting crop and separating grain from chaff and broken straw according to claim 1, further including an at least one extension element, wherein a velocity of an air flow stream in the area above the grain collecting element is variable by adjusting the at least one extension element.

5. The combine harvester for harvesting crop and separating grain from chaff and broken straw according to claim 1, wherein the grain collecting element is at an incline angle and wherein the incline angle is adjustable.

6. The combine harvester for harvesting crop and separating grain from chaff and broken straw according to claim 1, wherein the sucking blower unit is operatively mounted below the separation unit, wherein the sucking blower unit is operatively connected to the conduit by a connecting duct, and wherein the connecting duct is downwardly extending therefrom.

7. The combine harvester for harvesting crop and separating grain from chaff and broken straw according to claim 6, further including a discharge duct operatively connected to the sucking blower unit at one end and operatively connected to a chopper for chopping chaff and broken straw in the air flow stream.

8. The combine harvester for harvesting crop and separating grain from chaff and broken straw according to claim 1, wherein the air flow stream from the space between the at least one rotor housing and the grain collecting element and the air flow stream to the conduit are transverse with respect to one another.

9. The combine harvester for harvesting crop and separating grain from chaff and broken straw according claim 1, wherein the sucking blower unit is powered on and off.

10. A combine harvester for harvesting crop and separating grain from chaff and broken straw according to claim 1, wherein the at least one rotor housing has air inlet openings therein.

11. The combine harvester for harvesting crop and separating grain from chaff and broken straw according to claim 1, further comprising:

guide element operatively mounted in a transfer zone;

an outblow channel operatively mounted to a blower unit adjacent to the cleaning apparatus; and wherein the guiding element is directed towards duct through which an air flow stream is sucked by the sucking blower unit.

12. A combine harvester for harvesting crop and separating grain from chaff and broken straw, comprising:

a separation unit for separating the grain from the harvested crop;

at least one rotor housing with a sieve mechanism, wherein the sieve mechanism has plurality of sieve openings therein;

a rotor operatively and rotatably mounted in the at least one rotor housing;

a grain collecting element operatively mounted adjacent to and for receiving the grain from the sieve mechanism;

a cleaning apparatus for receiving grain collected from the grain collecting element;

a sucking blower unit for sucking an air flow stream towards the sucking blower unit, wherein the air flow stream is drawn upwardly through a conduit operatively connected thereto;

wherein the conduit directs the air flow stream from a space between the at least one rotor housing of the separation unit and the grain collecting element in a semi-circular movement towards the sucking blower unit; and wherein the conduit has a front wall operatively connected to two side walls at first ends of the two side walls and a rear wall operatively connected to second ends of the two side walls.

13. The combine harvester for harvesting crop and separating grain from chaff and broken straw according to claim 12, wherein the conduit has a cross-section that decreases in a direction moving away from the grain collecting element and towards the sucking blower unit.

14. A combine harvester for harvesting crop and separating grain from chaff and broken straw, comprising:
   a separation unit for separating the grain from the harvested crop;
   at least one rotor housing with a sieve mechanism, wherein the sieve mechanism had plurality of sieve openings therein;
   a rotor operatively and rotatably mounted in the at least one rotor housing;
   a grain collecting element operatively mounted adjacent to and for receiving the grain from the sieve mechanism;
   a cleaning apparatus for receiving grain collected from the grain collecting element;
   a sucking blower unit for sucking an air flow stream towards the sucking blower unit, wherein the air flow stream is drawn upwardly through a conduit operatively connected thereto;
   wherein the conduit directs the air flow stream from a space between the at least one rotor housing of the separation unit and the grain collecting element in a semi-circular movement towards the sucking blower unit; and
   wherein the conduit has a cross-section that decreases in a direction moving away from the grain collecting element and towards the sucking blower unit.

15. A combine harvester for harvesting crop and separating grain from chaff and broken straw, comprising:
   a separation unit for separating the grain from the harvested crop;
   at least one rotor housing with a sieve mechanism, wherein the sieve mechanism has plurality of sieve openings therein;
   a rotor operatively and rotatably mounted in the at least one rotor housing;
   a grain collecting element operatively mounted adjacent to and for receiving the grain from the sieve mechanism;
   a cleaning apparatus for receiving grain collected from the grain collecting element;
   a sucking blower unit for sucking an air flow stream towards the sucking blower unit, wherein the air flow stream is drawn upwardly through a conduit operatively connected thereto;
   wherein the conduit directs the air flow stream from a space between the at least one rotor housing of the separation unit and the grain collecting element in a semi-circular movement towards the sucking blower unit; and
   section walls operatively mounted to the at least one rotor housing having at least one extending element operatively and adjustably mounted thereto for manipulating the air flow stream above the grain collecting element;
   wherein the section walls define a path of travel for the air flow stream between the section walls; and wherein the air flow stream is directed through the path of travel between the section walls to an area above the grain collecting element.

16. A combine harvester for harvesting crop and separating grain from chaff and broken straw, comprising:
   a separation unit for separating the grain from the harvested crop;
   at least one rotor housing with a sieve mechanism, wherein the sieve mechanism has plurality of sieve openings therein;
   a rotor operatively and rotatably mounted in the at least one rotor housing;
   a grain collecting element operatively mounted adjacent to and for receiving the grain from the sieve mechanism;
   a cleaning apparatus for receiving grain collected from the grain collecting element;
   a sucking blower unit for sucking an air flow stream towards the sucking blower unit, wherein the air flow stream is drawn upwardly through a conduit operatively connected thereto;
   wherein the conduit directs the air flow stream from a space between the at least one rotor housing of the separation unit and the grain collecting element in a semi-circular movement towards the sucking blower unit; and
   wherein the sucking blower unit is operatively mounted above the separation unit.

17. The combine harvester for harvesting crop and separating grain from chaff and broken straw according to claim 16, further including a discharge duct operatively connected to and extending from the sucking blower unit for discharging the air flow stream having the chaff and the straw from the combine harvester in a downward direction.

18. The combine harvester for harvesting crop and separating grain from chaff and broken straw according to claim 17, wherein the discharge duct has guiding vanes therein.

19. The combine harvester for harvesting crop and separating grain from chaff and broken straw according to claim 17, wherein the discharge duct has a loss sensors therein.

20. The combine harvester for harvesting crop and separating grain from chaff and broken straw according to claim 18, wherein the discharge duct has a loss sensors therein.

21. A combine harvester for harvesting crop and separating grain from chaff and broken straw, comprising:
   a separation unit for separating the grain from the harvested crop;
   at least one rotor housing with a sieve mechanism, wherein the sieve mechanism has a plurality of sieve openings therein;
   a rotor operatively and rotatably mounted in the at least one rotor housing;
   a grain collecting element operatively mounted adjacent to and for receiving the grain from the sieve mechanism;
   a cleaning apparatus for receiving grain collected from the grain collecting element;
   a sucking blower unit for sucking an air flow stream towards the sucking blower unit, through a conduit operatively connected thereto;
   wherein the conduit directs the air flow stream having the chaff and the broken straw from a space between the at least one rotor housing of the separation unit and the grain collecting element towards the sucking blower unit;

wherein the sucking blower unit blows the chaff and the broken straw through a discharge duct into a chopper;

a first discharge location for discharging the chaff and the broken straw; and a second discharge location for discharging the chaff and the broken straw received from the chopper.

22. The combine harvester for harvesting crop and separating grain from chaff and broken straw according claim 21, wherein the sucking blower unit is powered on and off.

23. The combine harvester for harvesting crop and separating grain from chaff and broken straw according to claim 21, wherein the at least one rotor housing has air inlet openings therein.

24. The combine harvester for harvesting crop and separating grain from chaff and broken straw according to claim 21, further comprising:

guide element operatively mounted in a transfer zone;

an outblow channel operatively mounted to a blower unit adjacent to the cleaning apparatus; and wherein the guiding element is directed towards duct through which an air flow stream is sucked by the sucking blower unit.

25. A combine harvester for harvesting crop and separating grain from chaff and broken straw, comprising:

a separation unit for separating the grain from the harvested crop;

at least one rotor housing with a sieve mechanism, wherein the sieve mechanism has a plurality of sieve openings therein;

a rotor operatively and rotatably mounted in the at least one rotor housing;

a grain collecting element operatively mounted adjacent to and for receiving the grain from the sieve mechanism;

a cleaning apparatus for receiving grain collected from the grain collecting element;

a sucking blower unit for sucking an air flow stream towards the sucking blower unit, through a conduit operatively connected thereto;

wherein the conduit directs the air flow stream having the chaff and the broken straw from a space between the at least one rotor housing of the separation unit and the grain collecting element towards the sucking blower unit;

a first discharge location for discharging chaff and broken straw; and a second discharge location for discharging the chaff and the broken straw received from the sucking blower unit.

26. The combine harvester for harvesting crop and separating grain from chaff and broken straw according claim 25, wherein the sucking blower unit is powered on and off.

27. The combine harvester for harvesting crop and separating grain from chaff and broken straw according to claim 25, wherein the at least one rotor housing has air inlet openings therein.

28. The combine harvester for harvesting crop and separating grain from chaff and broken straw according to claim 25, further comprising:

guide element operatively mounted in a transfer zone;

an outblow channel operatively mounted to a blower unit adjacent to the cleaning apparatus; and wherein the guiding element is directed towards duct through which an air flow stream is sucked by the sucking blower unit.

* * * * *